(12) United States Patent
Altrichter

(10) Patent No.: US 10,274,582 B2
(45) Date of Patent: Apr. 30, 2019

(54) REMOTE UNIT DATA REGISTRATION

(71) Applicant: BAE SYSTEMS INFORMATION AND ELECTRONIC SYSTEMS INTEGRATION INC., Nashua, NH (US)

(72) Inventor: Wayne W Altrichter, Chatham, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 182 days.

(21) Appl. No.: 15/281,849

(22) Filed: Sep. 30, 2016

(65) Prior Publication Data

US 2018/0143290 A1 May 24, 2018

(51) Int. Cl.
| | | |
|---|---|---|
| G01S 5/14 | (2006.01) | |
| G01C 21/00 | (2006.01) | |
| G01S 5/02 | (2010.01) | |
| G01S 5/16 | (2006.01) | |
| G01S 5/20 | (2006.01) | |
| G01S 5/22 | (2006.01) | |
| G01S 5/24 | (2006.01) | |
| G01S 5/26 | (2006.01) | |
| G01S 11/02 | (2010.01) | |
| G01S 5/00 | (2006.01) | |

(52) U.S. Cl.
CPC .............. *G01S 5/14* (2013.01); *G01C 21/005* (2013.01); *G01S 5/0018* (2013.01); *G01S 5/02* (2013.01); *G01S 5/0263* (2013.01); *G01S 5/0278* (2013.01); *G01S 5/0294* (2013.01); *G01S 5/16* (2013.01); *G01S 5/20* (2013.01); *G01S 5/22* (2013.01); *G01S 5/24* (2013.01); *G01S 5/26* (2013.01); *G01S 11/02* (2013.01); *G01S 2205/003* (2013.01)

(58) Field of Classification Search
CPC ........ G01S 5/14; G01S 5/0294; G01C 21/005
USPC ......................................................... 701/519
See application file for complete search history.

(56) References Cited

U.S. PATENT DOCUMENTS

| | | | |
|---|---|---|---|
| 6,931,322 B2 | 8/2005 | Jung et al. | |
| 9,633,447 B2 * | 4/2017 | Swaminathan | .... G06K 9/00671 |
| 9,712,761 B2 * | 7/2017 | Vartanian | ............... H04N 5/265 |

(Continued)

OTHER PUBLICATIONS

International Search Report, PCT/US2017/053882, dated Nov. 30, 2017, 9 pages.

*Primary Examiner* — Muhammad Shafi
(74) *Attorney, Agent, or Firm* — Maine Cernota & Rardin; Scott J. Asmus

(57) ABSTRACT

A system and method is provided for registering outputs from a plurality of remote positional data sources, the system having: a plurality of positional data sources disposed on a plurality of units providing a plurality of types of positional data relative to at least one commonly tracked object held as a local positional data source; a processor disposed on a unit configured to process the positional data from each positional data source and apply a filter to the positional data; and the processor configured to weigh the positional data based on a probability of that a positional datum in the positional data is accurate and using weighted positional data to identify an absolute location of the commonly tracked object.

12 Claims, 4 Drawing Sheets

(56) References Cited

U.S. PATENT DOCUMENTS

| | | | |
|---|---|---|---|
| 2007/0265527 A1* | 11/2007 | Wohlgemuth | A61B 6/547 600/424 |
| 2012/0243732 A1* | 9/2012 | Swaminathan | G06K 9/00671 382/103 |
| 2014/0028485 A1 | 1/2014 | Nordlie et al. | |
| 2014/0278181 A1 | 9/2014 | Altrichter | |
| 2015/0130664 A1 | 5/2015 | Hill et al. | |
| 2015/0178953 A1* | 6/2015 | Gao | G06F 17/2765 345/681 |
| 2015/0253414 A1 | 9/2015 | Chan et al. | |
| 2015/0350561 A1* | 12/2015 | Vartanian | H04N 5/265 348/598 |
| 2016/0047889 A1* | 2/2016 | Takahashi | G01S 5/16 250/203.6 |
| 2016/0219552 A1* | 7/2016 | Chen | H04W 64/006 |

\* cited by examiner

REMOTE UNIT DATA REGISTRATION

FIELD

The disclosure relates to navigational data processing, and more particularly, to a system and method for determining the absolute location of a commonly tracked object.

BACKGROUND

The phrase "network-centric warfare" is widely used today to refer to the fact that military operations have grown increasingly reliant on the ability to exchange, process, and act upon information created by any unit operating within a "network". This information can be used for a variety of applications including the creation and maintenance of a common track picture, local and network-wide command and decision processing, and local and network-wide engagement planning and execution. The degree to which any of this functionality can be properly and effectively discharged is highly dependent on the accuracy of the data being exchanged and the ability to combine or fuse that data in a coherent fashion. To a large extent, this accuracy will be dictated by the degree to which the sensor and navigation data from each of the participating platforms can be aligned and brought into a common reference frame, in particular the World Geodetic System 1984 (WGS-84) earth model and the Universal Coordinated Time (UTC) standard.

When sensor platforms exchange track information on the tactical data links, units often attempt to correlate incoming "remote" tracks with tracks formed by "local" sensors to determine which objects are held in common (and who should report on it) and which are unique (and thus need to be reported by the local unit). If these tracks are not properly aligned, the likelihood of making correct correlation decisions is significantly reduced, leading to a plethora of problems in maintaining and using local and remote track data. The alignment of multiple "remote unit" sensor and navigation data with a "local" unit's sensor and navigation data is known as "Remote Unit" or "Interface Unit (IU)" Data Registration. What is needed therefore are techniques to estimate the remote unit sensor and navigation errors relative to the local unit and to remove those remote unit errors so the remote data is correctly aligned with the local data for the same tracked objects.

SUMMARY

One embodiment of the present disclosure provides a system for registering outputs from a plurality of positional data sources, the system comprising: a plurality of positional data sources disposed on a plurality of units providing a plurality of types of positional data relative to at least one commonly tracked object; a processor disposed on a unit configured to process the positional data from each the positional data source and apply a filter to the positional data; and the processor configured to weigh the positional data based on a probability of that a positional datum in the positional data is accurate and using weighted positional data to identify an absolute location of the commonly tracked object.

Another embodiment of the present disclosure provides such a system wherein each the positional data source within the plurality of positional data sources provides a single type of positional data.

A further embodiment of the present disclosure provides such a system wherein at least one unit is the commonly tracked object.

Yet another embodiment of the present disclosure provides such a system wherein the positional data comprises communications data.

A yet further embodiment of the present disclosure provides such a system wherein the communications data comprises message time stamps.

Still another embodiment of the present disclosure provides such a system wherein datum having low probability of accuracy is corrected by a correction factor based on registered data from other the sources.

A still further embodiment of the present disclosure provides such a system wherein all the data from a data source reporting the datum having low probability of accuracy is adjusted by the correction factor.

Even another embodiment of the present disclosure provides such a system wherein the correction factor comprises an offset.

An even further embodiment of the present disclosure provides such a system further comprising at least one additional processor disposed on at least one other unit configured to process the positional data from each the positional data source and apply the Kalman filter to estimate the positional data source errors or offsets.

A still even another embodiment of the present disclosure provides such a system wherein the unit is a master unit and propagates registered position data to other units with a network.

A still even further embodiment of the present disclosure provides such a system wherein units within the plurality of units calculate their own location relative to the absolute location of the commonly tracked object.

Still yet another embodiment of the present disclosure provides such a system wherein the filter is a Kalman filter.

One embodiment of the present disclosure provides a method for determining the absolute location of a commonly tracked object, the method comprising: Selecting at least one commonly tracked object; Obtaining positional data of the commonly tracked object relative to a plurality of positional data sources; Registering the positional data of the commonly tracked object; Applying a filter to the registered positional data of the commonly tracked object; Correcting registration errors in the registered positional data based on results of the filter; Outputting an absolute position of the commonly tracked object based on the corrected registered positional data.

Another embodiment of the present disclosure provides such a method further comprising preprocessing and screening the registered positional data.

A further embodiment of the present disclosure provides such a method further comprising buffering the positional data.

Yet another embodiment of the present disclosure provides such a method wherein the positional data is obtained from an interface selected from the group of interfaces consisting of Navigation interfaces, sensor interfaces, communication interfaces and tactical data link interfaces.

A yet further embodiment of the present disclosure provides such a method wherein the filter is a Kalman filter.

Still another embodiment of the present disclosure provides such a method further comprising alignment of positional data to absolute geographic and time standards.

A still further embodiment of the present disclosure provides such a method wherein the alignment relies on locally aligned reference data.

One embodiment of the present invention provides a non-transitory computer-readable storage medium storing a computer program or plurality of computer programs, the computer program or plurality of computer programs being arranged such that, when executed by a computer system or one or more processors, it/they cause the computer system or the one or more processors to operate in accordance with above-described method.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure describes a system that allows the data from a plurality of remote sensor positional data systems to be combined in a way that results in the enhancement of the remote positional data relative to the local sensor positional data. The system, in embodiments, also allows positional data obtained from such systems to be correlated with that of other similar systems in such a way that the resulting data is presented in absolute earth-referenced, as opposed to relative, terms. As used herein, commonly-tracked object refers to positional data that represents the same object for both the remote sensor positional data and the local sensor positional data. That is, both the remote sensor and the local sensor observe and track the same object.

Figure 1:
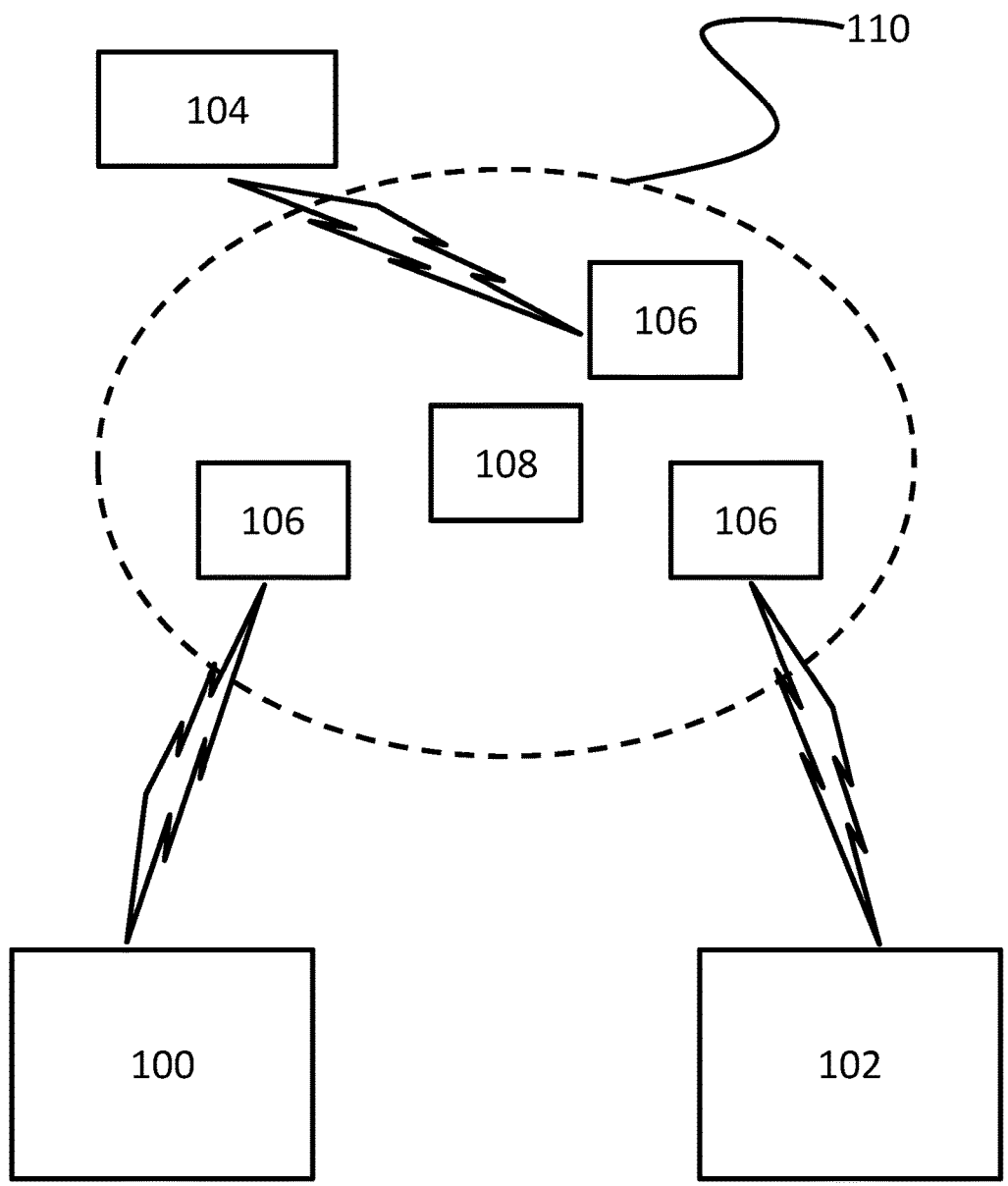
FIG. 1 is a block diagram illustrating a three-platform system tracking a common target, configured in accordance with one embodiment of the present disclosure.

Referring to one embodiment illustrated in FIG. 1, the positional data 106 regarding a commonly-tracked object 108 such as obtained from an aircraft 104 and a ground unit 102 may be accurate relative to those units' reference points, however, the lack of a common reference point may still result in errors when the positional data is attempted to be used by a boat 100 to determine a location relative to its reference point for the commonly-tracked object 108.

Figure 2:
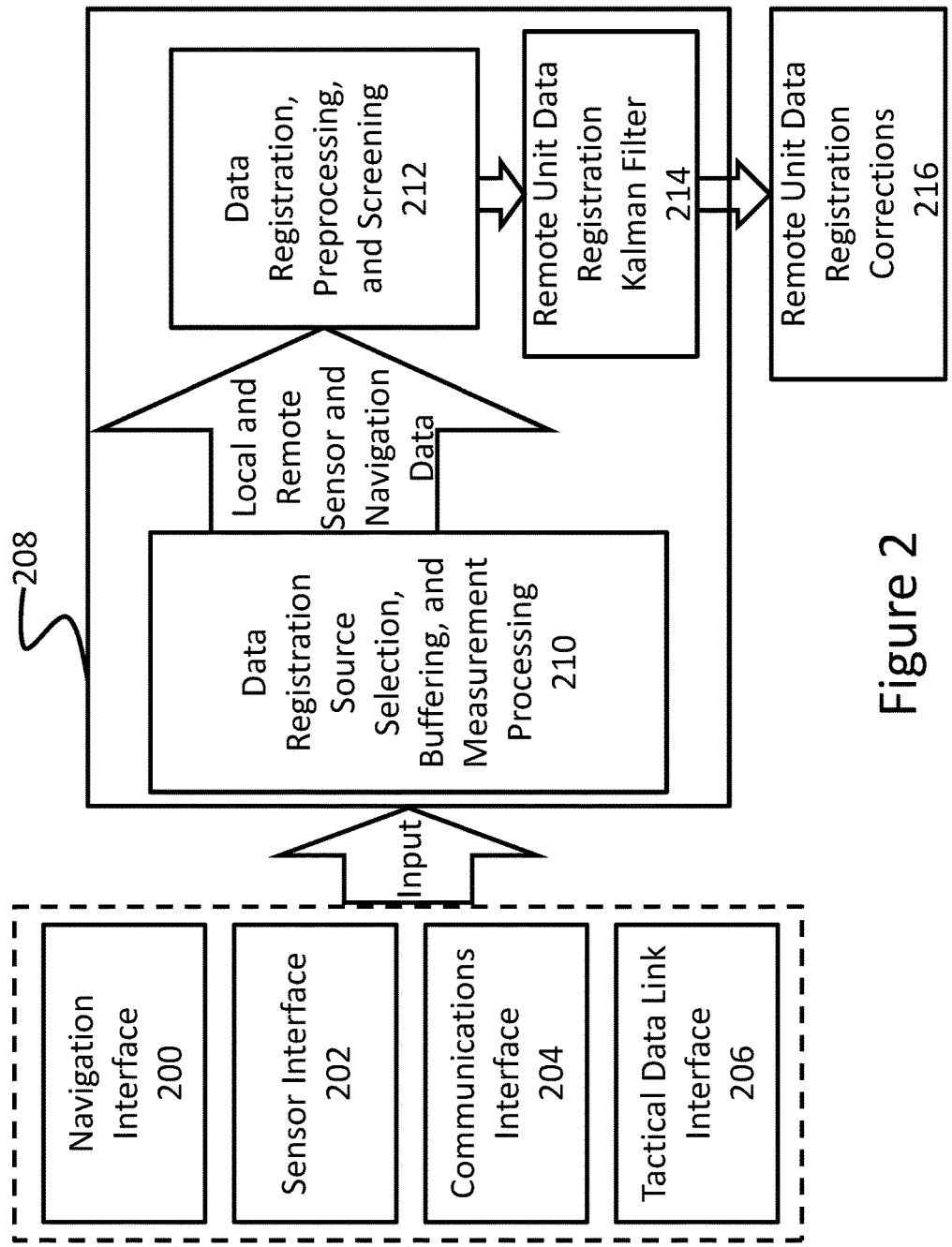
FIG. 2 is a flowchart illustrating the flow of positional data through a system configured in accordance with one embodiment of the present disclosure.

Alternatively, the data from a plurality of such systems regarding a specific object 108, which may be a friendly aircraft, vehicles or a potential target, may be combined such that errors in any given system may be corrected with respect to the local unit receiving positional data from the remote units. In embodiments, these goals may be achieved through the use of an estimator, for example a Kalman filter, 214 such as shown in FIG. 2, configured to process a variety of data types from a plurality of data sources (e.g. 200/202/204/206) and weight each factor according to its probabilities of errors, among other factors. Through the use of such a system, highly accurate data that is meaningful in absolute terms may be obtained and the deficiencies of individual sources of positional data determined and compensated for, in realtime and without specific pre-programming, allowing for increased accuracy and ability.

Referring to FIG. 2, a Remote Unit Data Registration (RUDR) system 208 configured according to one embodiment provides a comprehensive solution for the data registration 212 of remote units 100/102/104 which aligns each remote units' 100/102/104 positional data 106 with respect to the local unit's 100/102/104 (each unit may be considered local to itself and remote to other units, dependent on perspective) to navigation and sensor data using commonly tracked objects 108. These commonly tracked objects 108 may include Self-Reported Objects (SROs) or mutually tracked objects, which may be referred to as Common Air Objects (CAOs) 108. The system 208, according to one embodiment, permits the alignment of remote unit 100/102/104 sensor and navigation data 106 to absolute geographic (WGS-84) and time (UTC U.S. Naval Observatory (USNO)) standards, given appropriate locally aligned navigation and sensor reference data, and may gracefully degrade to relative alignment if that local reference data is not available.

The Remote Unit Data Registration (RUDR) system 208 configured according to one embodiment, provides a unique approach to the estimation and removal of time, navigation, and sensor system bias errors present in remote unit 100/102/104 positional data 106. The RUDR system 208 was developed as a general absolute data registration solution for aligning remote unit 100/102/104 data 106 with local unit 100/102/104 data 106 for a wide variety of joint network systems. The system solves for the primary physical errors present in track position reports received from remote units 100/102/104 (sensor range, azimuth, elevation, misalignments; navigation position and time). The RUDR algorithms 214 solve for each remote units' 100/102/104 errors, whether operating in a single network or operating in more than one network simultaneously, e.g., Link 16 and Link 11. Details on the Link 16 Requirement regarding registration are found in MIL-STD 6016D, Paragraph 4.2.7, "IU Track Registration".

The RUDR approach utilizes an 11-state Remote Unit Data Registration Kalman Filter (RUDRKF) 214, which would be used to estimate each Remote Units' 100/102/104 data registration errors present in information received from that unit. A RUDR solution would be generated for each remote unit 100/102/104 that the local unit 100/102/104 is receiving positional information 106 from in the network(s). The result is a Remote Unit Data Registration solution that may be used by a local unit 100/102/104 to remove remote unit 100/102/104 registration errors thereby enhancing the local-to-remote track correlation and track management functions. This capability may be applied to the exchange of data on all airborne, ground, or water-based systems.

It should be recognized that while it would be desirable for all local units 100/102/104 to perform their own estimation of their respective "local" data registration errors, it will always be the case that some legacy units 300, or simply units that have limited resources, will not perform this function, and therefore other units 302 will need to perform it for them. However, if remote units 100/102/104 are accurately registering their data, then the RUDRKF should estimate approximately zero errors for that remote unit 100/102/104. This has the added benefit of RUDR algorithms 214 being capable of monitoring network performance and detecting inconsistencies.

Specifically referring to FIG. 2, a flowchart describing the RUDR system, as used in embodiments of the present disclosure, is shown. Data is first obtained from navigation 200, sensor 202, communications 204, and tactical data link 206 interfaces, and is then input into the RUDR system 208. A module 210 then performs data registration source selection, buffering and measurement processing before sending the local and remote sensor and naviation data to a data registration, preprocessing and screening module 212 for further processing. After the preprocessing and screening has taken place, the data is sent to a RUDRKF module 214, which corrects the remote data, providing the information necessary to align that data to the local data, following which a remote unit registration correction module 216 implements the required corrections in the remote data for use in the local system.

Figure 3:
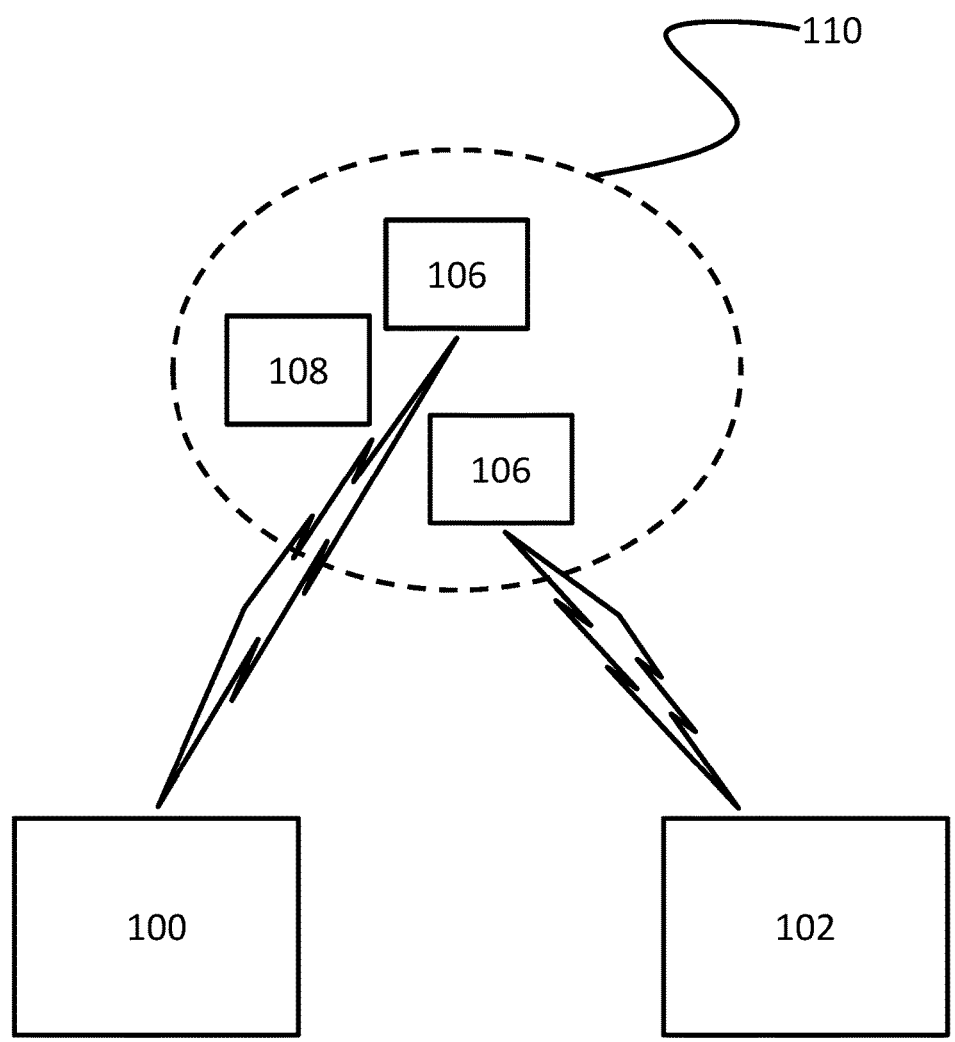
FIG. 3 is a block diagram showing a two-platform system, configured in accordance with one embodiment of the present disclosure.

Referring to FIG. 3, the positional data 106 regarding a commonly-tracked object 108 is illustrated for two-platforms 100 and 102. If the local sensor and navigation registration errors for 100 and 102 were estimated and removed by each local system, then their respective positional data 106 would be coincident with the true positional data 108 of the commonly-tracked object. When the difference between 106 and 108 is sufficiently large the exchange of positional data 106 between 100 and 102 may lead to ambiguous tracking of the object 108, e.g., mis-identification, dual tracks.

Figure 4:
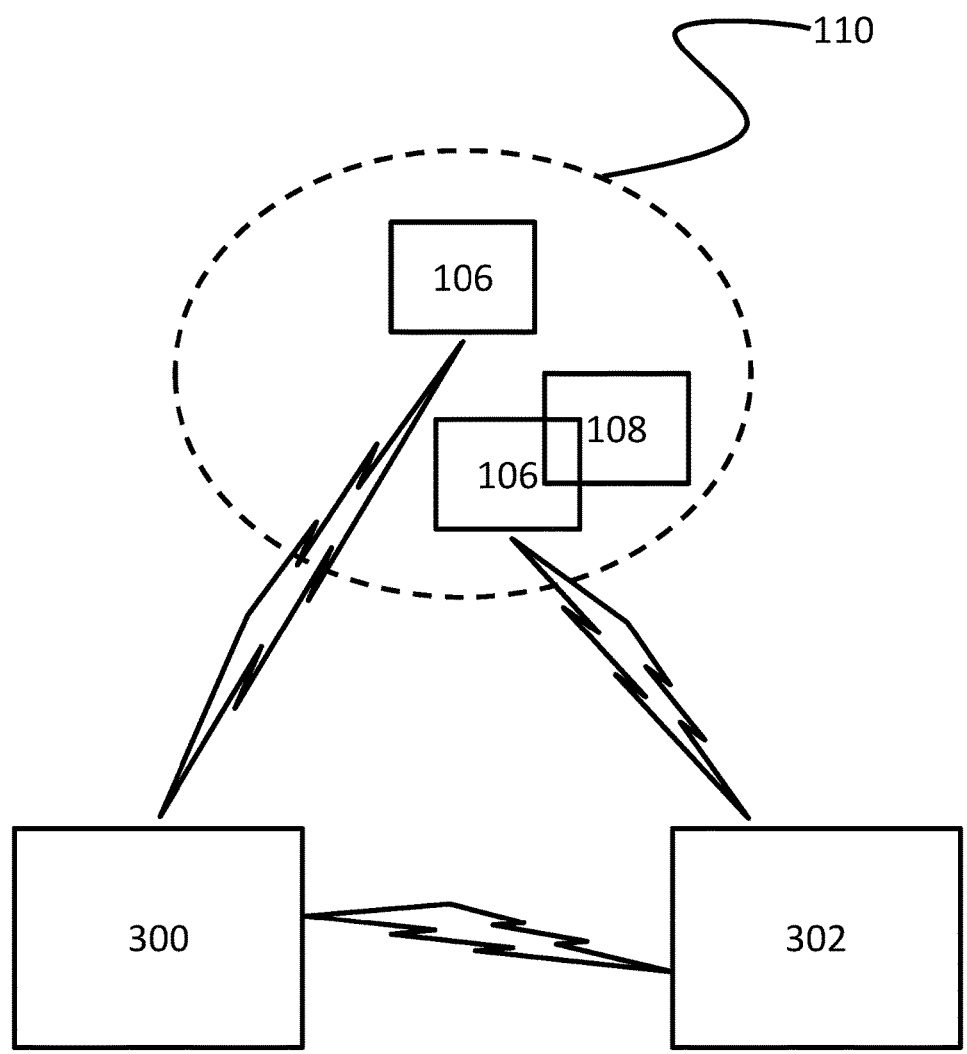
FIG. 4 is a block diagram showing a two-platform system, configured in accordance with one embodiment of the present disclosure.

Referring to FIG. 4, the communication exchange of positional data 106 regarding a commonly-tracked object 108 is illustrated for two-platforms, a legacy non-RUDR platform 300, and a RUDR platform 302. The non-RUDR platform 300 communicates its positional data 106 to the RUDR platform 302, e.g., using Link 16. The RUDR platform 302 utilizes the RUDR system shown in FIG. 2 to align the positional data 106 received from 300 with the positional data 106 held locally by 302 for the commonly-tracked object 108. This is achieved by RUDR platform 302 estimating the remote non-RUDR platform's navigation and sensor errors present in its positional data 106.

Any RUDR platform would perform this estimation for all remote unit positional data received from other non-RUDR and RUDR platforms to ensure proper remote positional data 106 alignment with local positional data alignment 106 for all commonly-tracked objects 108.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the invention be limited not by this detailed description, but rather by the claims appended hereto.

What is claimed is:

1. A system for registering outputs from a plurality of remote positional data sources with local positional data sources for commonly tracked objects, said system comprising:
   a plurality of remote positional data sources disposed on a plurality of units providing a plurality of types of positional data relative to at least one commonly tracked object;
   a processor disposed on a local unit configured to process said positional data from said remote positional data sources and apply a filter to said remote positional data; and
   said local processor configured to weigh said remote positional data based on a probability that a positional datum in said remote positional data is accurate and using weighted positional data to identify an absolute local positional location of said commonly tracked object.

2. The system of claim 1 wherein each said positional data source within said plurality of positional data sources provides a single type of positional data.

3. The system of claim 1 wherein at least one commonly tracked object is provided between local and remote positional data sources.

4. The system of claim 1 wherein said positional data comprises communications data.

5. The system of claim 4 wherein said communications data comprises message time stamps.

6. The system of claim 1 wherein datum having low probability of accuracy is corrected by a correction factor based on registered data from other said sources.

7. The system of claim 6 wherein all said data from a remote data source reporting said datum having low probability of accuracy is adjusted by said correction factor by local data source.

8. The system of claim 7 wherein said correction factor comprises a set of navigation and sensor positional and angular errors.

9. The system of claim 1 further comprising at least one additional processor disposed on at least one other unit configured to process said positional data from each said positional data source and apply a Kalman filter to said positional data.

10. The system of claim 1 wherein said unit is a master unit and propagates registered position data to other units with a network.

11. The system of claim 1 wherein units within said plurality of units calculate their own location relative to said absolute location of said commonly tracked object.

12. A non-transitory computer-readable storage medium storing a computer program or plurality of computer programs, the computer program or plurality of computer programs being arranged such that, when executed by a computer system or one or more processors, it/they cause the computer system or the one or more processors to
   Select at least one commonly tracked object;
   Obtain positional data of said commonly tracked object relative to a plurality of positional remote data sources;
   Register said remote positional data of said commonly tracked object;
   Apply a filter to said registered positional data of said commonly tracked object;
   Correct remote registration errors in said registered remote positional data based on results of said filter; and
   Output an absolute position of said commonly tracked object based on said corrected registered remote positional data.

* * * * *